(12) United States Patent
Dong et al.

(10) Patent No.: US 9,723,041 B2
(45) Date of Patent: Aug. 1, 2017

(54) VEHICLE DOMAIN MULTI-LEVEL PARALLEL BUFFERING AND CONTEXT-BASED STREAMING DATA PRE-PROCESSING SYSTEM

(71) Applicant: International Business Machines Corporation, Armonk, NY (US)

(72) Inventors: Wei Shan Dong, Beijing (CN); Ning Duan, Beijing (CN); Peng Gao, Beijing (CN); Chang Sheng Li, Beijing (CN); Chun Yang Ma, Beijing (CN); Xin Zhang, Beijing (CN); Jun Zhu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/352,307

(22) Filed: Nov. 15, 2016

(65) Prior Publication Data
US 2017/0155696 A1  Jun. 1, 2017

Related U.S. Application Data

(63) Continuation of application No. 14/955,218, filed on Dec. 1, 2015, now Pat. No. 9,537,914.

(51) Int. Cl.
*G06F 15/16* (2006.01)
*H04L 29/06* (2006.01)
(Continued)

(52) U.S. Cl.
CPC ........ *H04L 65/4069* (2013.01); *G06F 9/4881* (2013.01); *G08G 1/0112* (2013.01); *H04L 67/12* (2013.01)

(58) Field of Classification Search
CPC ... H04L 65/4069; H04L 67/12; G06F 9/4881; G08G 1/0112
(Continued)

(56) References Cited

U.S. PATENT DOCUMENTS

| RE44,606 E | * | 11/2013 | Herz | ..................... | H04L 45/124 |
| | | | | | 370/229 |
| 8,705,527 B1 | * | 4/2014 | Addepalli | ............. | H04W 4/046 |
| | | | | | 370/389 |

(Continued)

OTHER PUBLICATIONS

List of IBM Patents or Patent Applications Treated as Related; (Appendix P), Filed Jan. 10, 2017; 2 pages.

*Primary Examiner* — Melvin H Pollack
(74) *Attorney, Agent, or Firm* — Cantor Colburn LLP; Alexa Ashworth (57) ABSTRACT

A vehicle domain multi-level parallel buffering and context-based streaming data pre-processing system includes a first data processing level and a second data processing level. The first data processing level includes a first-level buffer configured to buffer data provided from a plurality of raw data streams output from a plurality of vehicles. The second data processing level includes an electronic task-queue-dictionary (TQD) module and a plurality of second-level data processing buffers. The TQD module is configured to create a plurality of tasks in response to receiving a serial data stream output from the first-level buffer. The TQD module is further configured to assign each task to a corresponding second-level buffer, and separate the serial data stream into individual data values that are delivered to a specific second-level buffer based on the task so as to generate a multi-level parallel context-based buffering operation.

15 Claims, 6 Drawing Sheets

(51) Int. Cl.
*H04L 29/08* (2006.01)
*G08G 1/01* (2006.01)
*G06F 9/48* (2006.01)

(58) Field of Classification Search
USPC .......................................................... 709/219
See application file for complete search history.

(56) References Cited

U.S. PATENT DOCUMENTS

| | | | | |
|---|---|---|---|---|
| 8,738,389 B2 * | 5/2014 | Hjelm | ................. | H04L 12/2809 |
| | | | | 701/36 |
| 9,060,341 B2 * | 6/2015 | Karr | ........................ | G01S 1/026 |
| 9,085,310 B2 * | 7/2015 | McKillican | ............... | G01S 5/02 |
| 9,134,398 B2 * | 9/2015 | Dupray | ................... | G01S 1/026 |
| 9,241,044 B2 * | 1/2016 | Shribman | ............... | H04L 67/06 |
| 9,250,856 B2 * | 2/2016 | Danne | .................... | G06F 3/167 |
| 9,380,088 B2 * | 6/2016 | Jennings | ................ | H04N 7/165 |
| 9,459,607 B2 * | 10/2016 | Frazer | .................... | G05B 15/02 |
| 9,537,914 B1 | 1/2017 | Dong et al. | | |
| 9,576,404 B2 * | 2/2017 | Ziarno | ................. | H04B 1/3822 |
| 2015/0156266 A1 * | 6/2015 | Gupta | .................... | H04L 67/12 |
| | | | | 709/224 |
| 2015/0242190 A1 * | 8/2015 | Roelle | .................... | H04L 67/34 |
| | | | | 717/105 |
| 2016/0041534 A1 * | 2/2016 | Gupta | ................ | G05B 13/0265 |
| | | | | 700/275 |
| 2016/0259639 A1 * | 9/2016 | Blaschke | .................. | G06F 8/65 |
| 2016/0308822 A1 * | 10/2016 | Chae | .................... | H04L 61/2007 |
| 2016/0328272 A1 * | 11/2016 | Ahmed | .................... | G06F 9/4443 |
| 2016/0379486 A1 * | 12/2016 | Taylor | .................. | G08G 1/0141 |
| | | | | 340/905 |
| 2017/0006135 A1 * | 1/2017 | Siebel | .................... | H04L 67/02 |
| 2017/0039765 A1 * | 2/2017 | Zhou | .................... | G06T 19/006 |
| 2017/0039846 A1 * | 2/2017 | Chambers | ............. | G08G 1/091 |
| 2017/0070488 A1 * | 3/2017 | Jun | .................... | H04L 63/0471 |

* cited by examiner

VEHICLE DOMAIN MULTI-LEVEL PARALLEL BUFFERING AND CONTEXT-BASED STREAMING DATA PRE-PROCESSING SYSTEM

The present application is a Continuation of U.S. patent application Ser. No. 14/955,218, entitled "VEHICLE DOMAIN MULTI-LEVEL PARALLEL BUFFERING AND CONTEXT-BASED STREAMING DATA PRE-PROCESSING SYSTEM", filed on Dec. 1, 2015, which is incorporated herein by reference in its entirety.

BACKGROUND

The present invention relates to vehicle location-based services (LBS), and more specifically, to vehicle domain data streaming processing systems.

The increasing development of vehicle telematics, sensor and mobility technologies have given rise to the prevalence of mobile computing systems and location-based services (LBS). In order to enhance vehicle telematics applications, it is typically necessary to stream data of a moving vehicle with real-time LBS. Examples of these enhanced vehicle telematics applications include, for example, on-line event alerts, congestion monitoring, real-time driving route guidance, driver approaching alerts for ride-sharing application, and autonomous navigation.

Conventional attempts to process data streaming for facilitating LBS applications include implementing existing internet-based frameworks such as, for example, Hadoop, Storm, Spark etc. These internet-based frameworks, however, present various unique challenges. For instance, unlike conventional internet-based data processing methods that typically receive data from a stationary or substantially stationary terminal or node, the vehicle domain provides large amounts of constantly moving terminal devices operating under various conditions. In addition traditional GPS/3G/4G signals are unstable and easily affected by many factors. For example, weather conditions, high buildings, elevated roads, tunnels, bridges etc., may contribute to signal errors, interruptions, and delays.

Internet-based frameworks are also typically designed to process independent requests. The vehicle domain, however, is different in the sense that requests are not independent. That is, a single vehicle may request a multitude of requests at a single instance such as, for example, contextual map and road network information, events, traffic/weather conditions, dynamic navigation instructions, and detour instructions. Therefore, fast and large shared memory access is necessary to process the requests in parallel so as to avoid delivering stale data to the end-user.

SUMMARY

According to an embodiment of the present invention, a vehicle domain multi-level parallel buffering and context-based streaming data pre-processing system includes a first data processing level and a second data processing level. The first data processing level includes a first-level buffer configured to buffer data provided from a plurality of raw data streams output from a plurality of vehicles. The second data processing level includes an electronic task-queue-dictionary (TQD) module and a plurality of second-level data processing buffers. The TQD module is configured to create a plurality of tasks in response to receiving a serial data stream output from the first-level buffer. The TQD module is further configured to assign each task to a corresponding second-level buffer, and separate the serial data stream into individual data values that are delivered to a specific second-level buffer based on the task so as to generate a multi-level parallel context-based buffering operation.

According to another non-limiting embodiment, a method of processing data streams in a vehicle domain comprises buffering data provided from a plurality of raw data streams output from a plurality of vehicles using a first-level buffer installed at a first data processing level included in a multi-level parallel buffering and context-based streaming data pre-processing system. The method further comprises delivering a serial data stream output from the first-level buffer to an electronic task-queue-dictionary (TQD) module installed in a second data processing level included in the multi-level parallel buffering and context-based streaming data pre-processing system. The method further comprises creating a plurality of tasks via the TQD module in response to receiving the serial data stream. The TQD module is further configured to assign each task to a corresponding second-level buffer so as to separate the serial data stream into individual data values that are delivered to a specific second-level buffer based on the task.

In yet another non-limiting embodiment, a vehicle domain multi-level parallel buffering and context-based streaming data pre-processing system comprises a first-level buffer installed in a first data processing level. The first-level buffer is configured to concurrently queue data values provided from a plurality of data streams output from a plurality of vehicles. An electronic task-queue-dictionary (TQD) module is installed in a second data processing level different from the first data processing level, the TQD module is configured to receive a serial data stream output from the first-level buffer and separate the data values from the serial data stream based on a context of the data values. Second-level buffers are installed in the second data processing level. The second-level buffers have context buffer identification values assigned thereto and are configured to queue data values having a context that matches the context buffer identification value.

In still another non-limiting embodiment, a method of performing parallel buffering and context-based streaming data pre-processing in a vehicle domain comprises concurrently queuing in a first data processing level data values provided from a plurality of data streams output from a plurality of vehicles. The method further comprises receiving from a first-level buffer a serial data stream in a second data processing level and separating the data values from the serial data stream based on a context of the data values. The method further comprises assigning a context buffer identification value to each of a second-level buffers, and queueing data into respective second-level data buffers based on a comparison between the context of the data values and the context buffer identification values.

In another non-limiting embodiment, a computer program product controls a vehicle domain multi-level parallel buffering and context-based streaming data pre-processing system. The computer program product comprises a computer readable storage medium having program instructions embodied therewith, and are executable by an electronic computer processor such that the system performs operations comprising buffering data provided from a plurality of raw data streams output from a plurality of vehicles using a first-level buffer installed at a first data processing level included in a multi-level parallel buffering and context-based streaming data pre-processing system. The operations further include delivering a serial data stream output from the first-level buffer to an electronic task-queue-dictionary (TQD) module installed in a second data processing level included in the multi-level parallel buffering and context-based streaming data pre-processing system. The operation further include creating a plurality of tasks via the TQD module in response to receiving the serial data stream. The operation further include commanding the TQD module to assigns each task to a corresponding second-level buffer so as to separate the serial data stream into individual data values that are delivered to a specific second-level buffer based on the task.

Additional features are realized through the techniques of the present invention. Other embodiments are described in detail herein and are considered a part of the claimed invention. For a better understanding of the invention with the features, refer to the description and to the drawings.

DETAILED DESCRIPTION

Various embodiments provide a multi-level parallel buffering and context-based streaming data pre-processing system capable of facilitating a context-based data pre-processing data streams output by a plurality of vehicles, especially during peak data periods. The multi-level parallel buffering and context-based streaming data pre-processing system provides fast and large shared memory access based on data context (e.g., vehicle ID information, task ID information, timestamp information, etc. for an individual vehicle.

In at least one embodiment, the system performs parallel data processing between vehicles, but serial processing for data output from each vehicle. Accordingly, at least one embodiment provides a system that saves approximately eight to approximately sixteen times of memory usage on a multi-core computer (e.g., 8-core computer) compared to conventional process level computing frameworks such as, for example, Hadoop, Storm, and Spark. The parallel data pre-processing buffering also resolves concerns of low throughput caused by unbalanced CPU-Core utilization to achieve high throughput with balanced unbalanced CPU-Core utilization.

According to at least one embodiment, the multi-level parallel buffering and context-based streaming data pre-processing system may decrease the latency in real-time location-based services during peak data rate periods by approximately 20% to approximately 30%. During peak data rate periods, for example, the multi-level parallel buffering and context-based streaming data pre-processing system can initially organize high volume data in a first-level buffering queue, and then quickly dispatch first-level buffered data into a second-level buffering queue to perform context based data pre-processing. In this manner, the location-based services can efficiently discard useless data in a timely manner, thereby improving the performance and output of the computer system, server and/or cloud network.

Figure 1:
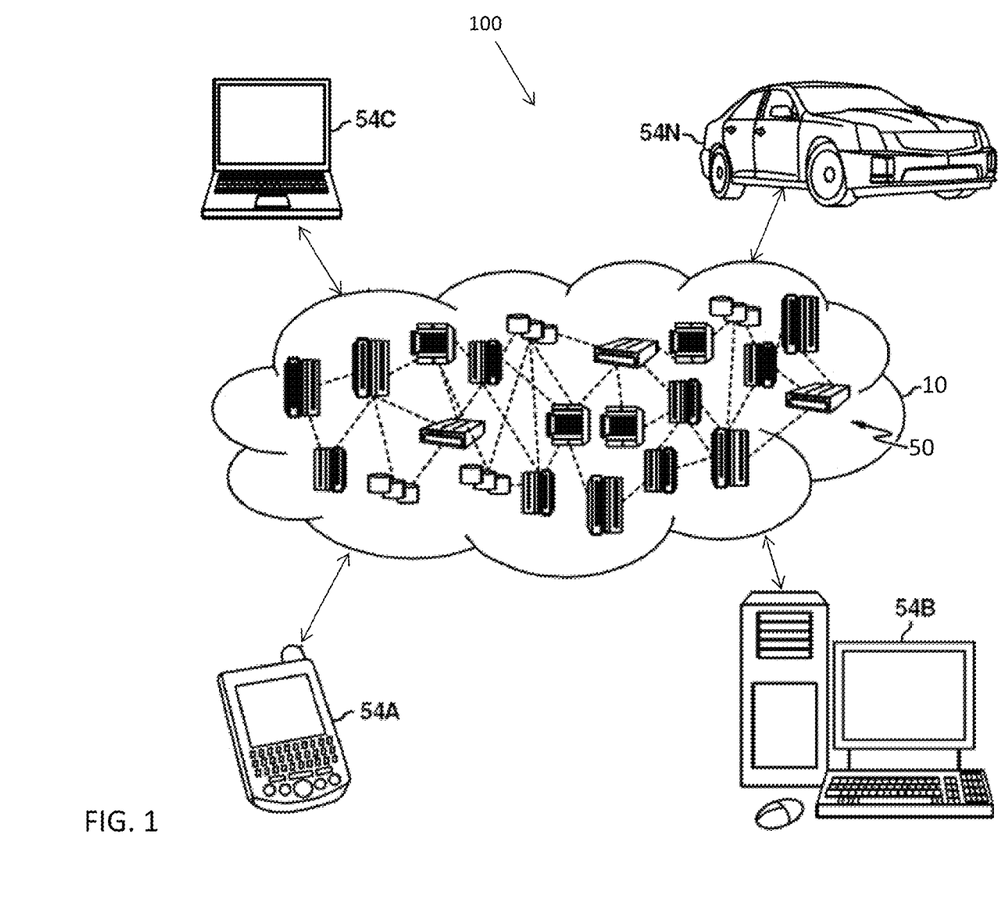
FIG. 1 illustrates a cloud computing environment capable of supporting core logic included in a vehicle domain multi-level parallel buffering and context-based streaming data pre-processing system according to a non-limiting embodiment.

With reference now to FIG. 1, a cloud computing environment 10 capable of supporting core logic included in a vehicle domain multi-level parallel buffering and context-based streaming data pre-processing system 100 is illustrated according to a non-limiting embodiment. As shown, cloud computing environment 10 comprises one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. In at least one embodiment, the automobile computer system 54N may include a mobile data terminal configured to exchange data with cloud computing environment. The nodes 50 may communicate with one another. They may be grouped (not shown) physically or virtually, in one or more networks, such as Private, Community, Public, or Hybrid clouds as described hereinabove, or a combination thereof. This allows cloud computing environment 10 to offer infrastructure, platforms and/or software as services for which a cloud consumer does not need to maintain resources on a local computing device. It is understood that the types of computing devices 54A-N shown in FIG. 2 are intended to be illustrative only and that computing nodes 50 and cloud computing environment 10 can communicate with any type of computerized device over any type of network and/or network addressable connection (e.g., using a web browser).

Figure 2:
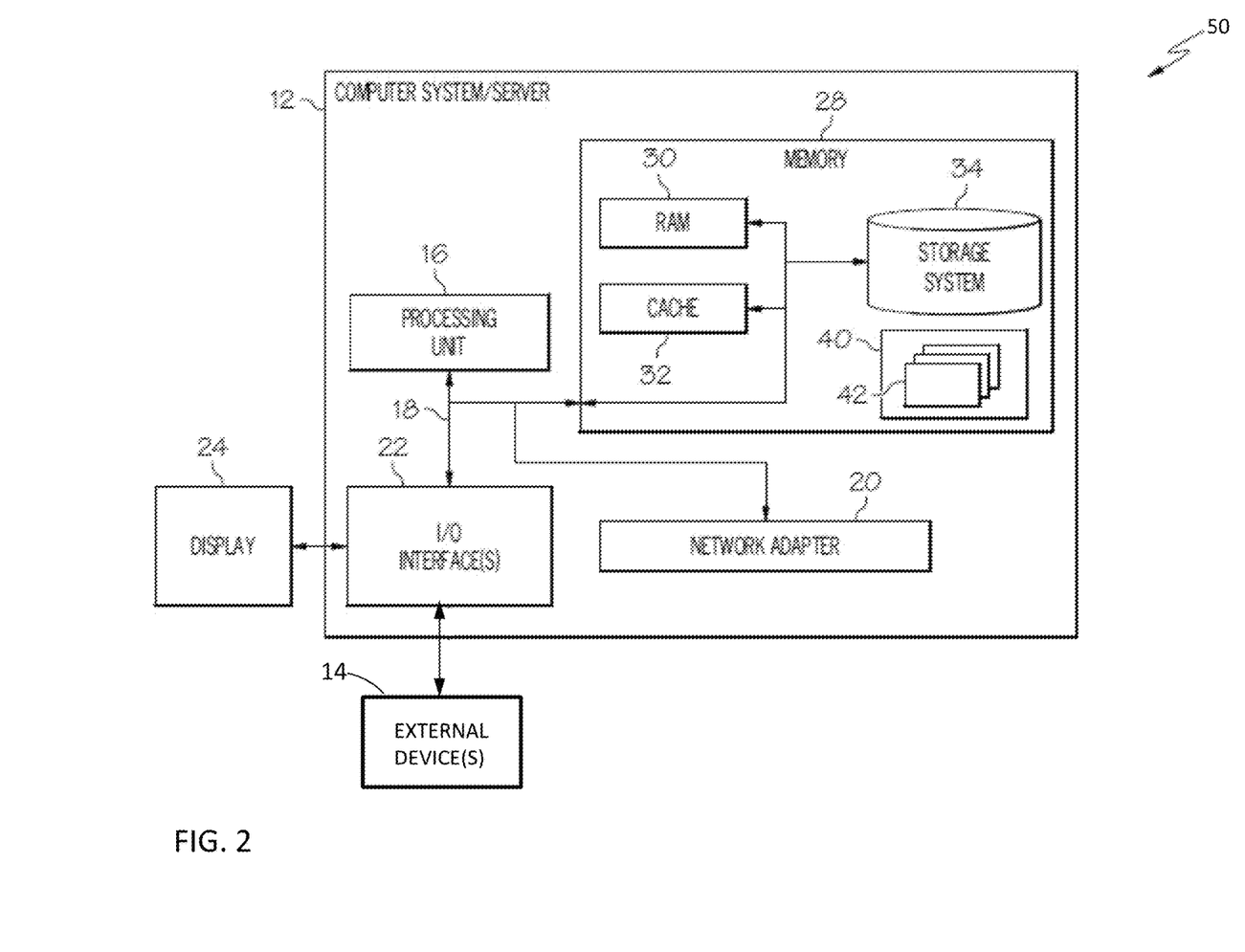
FIG. 2 is a schematic diagram of a cloud computing node included in a distributed cloud environment.

Referring now to FIG. 2, a schematic of a cloud computing node 50 included in a distributed cloud environment or cloud service network is shown according to a non-limiting embodiment. The cloud computing node 50 is only one example of a suitable cloud computing node and is not intended to suggest any limitation as to the scope of use or functionality of embodiments of the invention described herein. Regardless, cloud computing node 50 is capable of being implemented and/or performing any of the functionality set forth hereinabove.

In cloud computing node 50 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system/server 12 in cloud computing node 50 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via input/output (I/O) interfaces 22. Still yet, the computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems.

Figure 3:
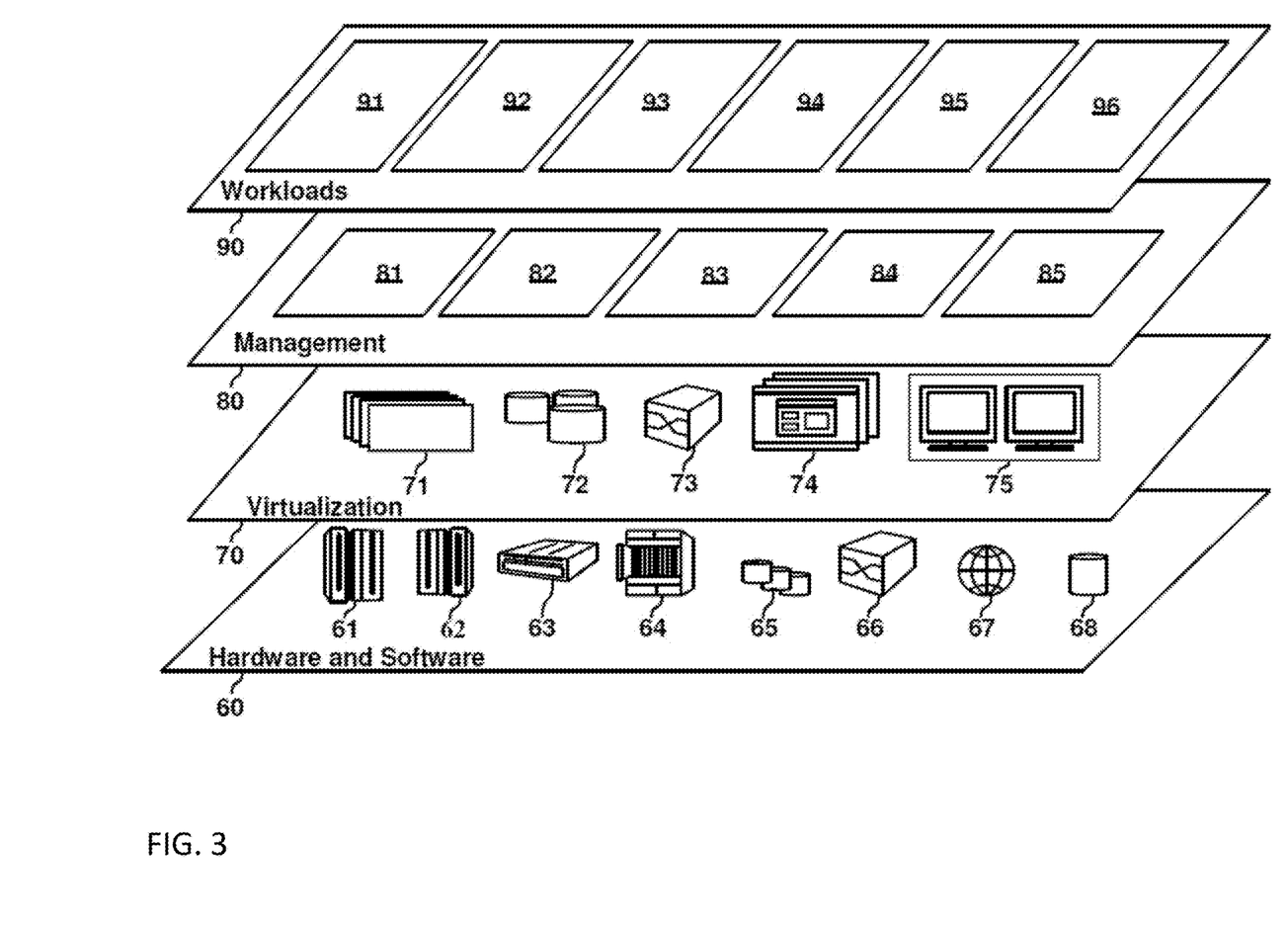
FIG. 3 is a set of functional abstraction layers provided by a cloud computing environment capable of supporting core logic included in a vehicle domain multi-level parallel buffering and context-based streaming data pre-processing system according to a non-limiting embodiment.

Referring now to FIG. 3, a set of functional abstraction layers provided by cloud computing environment 10 is shown. It should be understood in advance that the components, layers, and functions shown in FIG. 3 are intended to be illustrative only and embodiments of the invention are not limited thereto. As depicted, various layers and corresponding functions provided by the cloud computing environment 10 are described in greater detail below.

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provided pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation;

software development and lifecycle management; virtual classroom education delivery; data analytics processing; and transaction processing.

Although a cloud environment capable of supporting the core logic of the vehicle domain multi-level parallel buffering and context-based streaming data pre-processing system 100 is described in detail above, it should be appreciated that the core logic of the vehicle domain multi-level parallel buffering and context-based streaming data pre-processing system 100 can reside locally on one or more of the devices 54A-54N. For instance, each automotive vehicle computer system 54N may have installed locally thereon the core logic of the vehicle domain multi-level parallel buffering and context-based streaming data pre-processing system 100. In this manner, the devices 54A-54N can perform locally the various features and operations of the vehicle domain multi-level parallel buffering and context-based streaming data pre-processing system 100.

Figure 4:
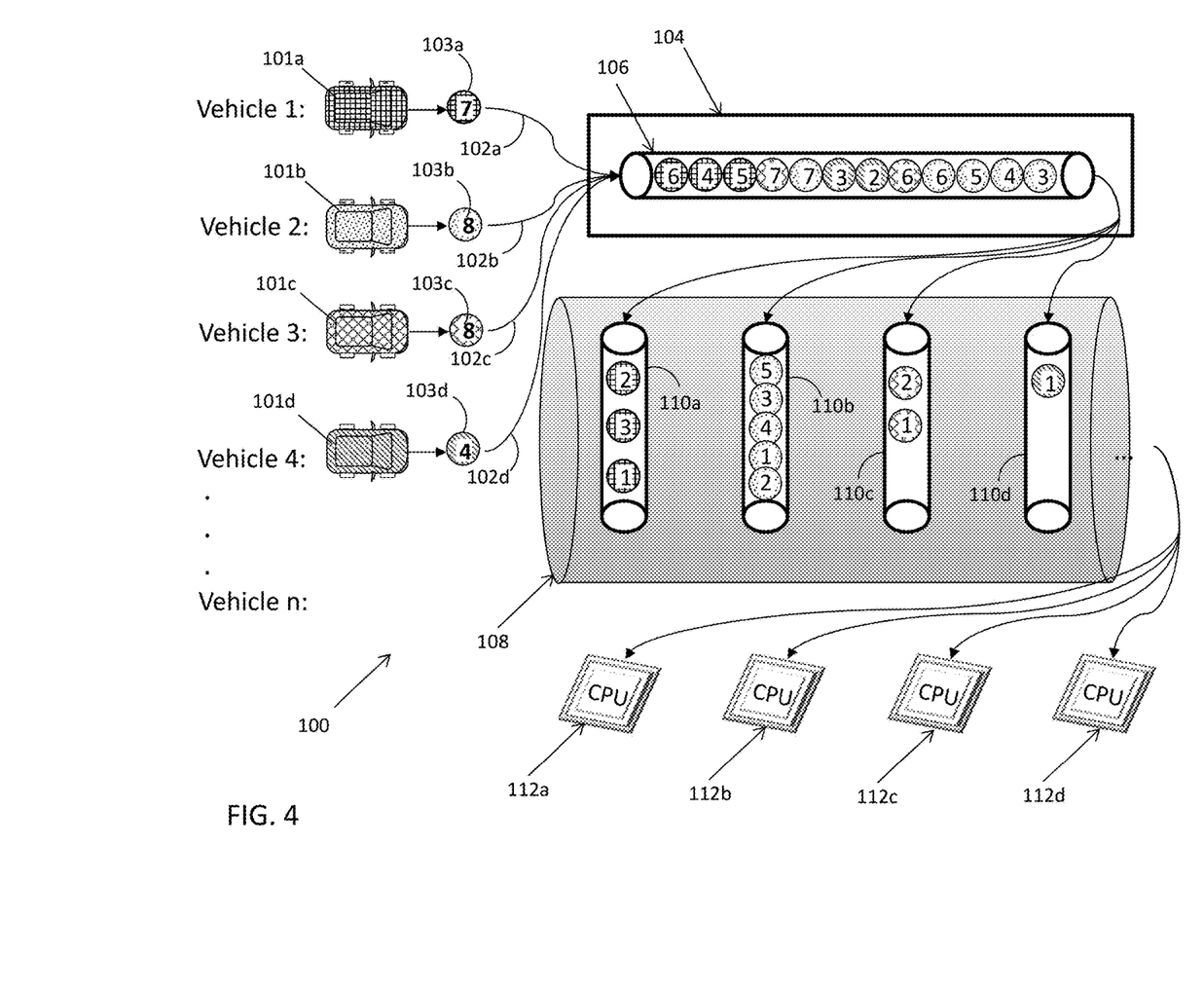
FIG. 4 is a diagram illustrating operation of a vehicle domain multi-level parallel buffering and context-based streaming data pre-processing system according to a non-limiting embodiment.

Turning now to FIG. 4, operation of a vehicle domain multi-level parallel buffering and context-based streaming data pre-processing system 100 is illustrated according to a non-limiting embodiment. One or more vehicles 101a-101d are in signal communication with the system 100, and outputs a respective real-time data stream 102a-102d. According to a non-limiting embodiment, each data-stream 101a-101d is output in serial, and includes a sequence of data values such as, for example, tuples 103a-103d, indicating the context of the data. The tuples 103a-103d may include, for example, <ID of vehicle 101a, a task header ID, trip ID of vehicle 101a, timestamp of vehicle 101a, location of vehicle 101a, speed of vehicle 101a, heading of vehicle 101a, . . . >, <ID of vehicle 101b, task header ID, trip ID of vehicle 101b, timestamp of vehicle 101b, location of vehicle 101b, speed of vehicle 101b, heading of vehicle 101b, . . . <, etc. Each tuple 103a-103d in the data-stream 102a-102d of a respective vehicle 101a-101d has a sequence identifier such as, for example, a timestamp. For instance, the timestamp identifier is indicated by the numbers corresponding to each tuple, e.g., 1, 2, 3 . . . 8, etc.

The system 100 includes a first data processing level 104 which supports a first-level buffer 106, and a second data processing level 108 which supports one or more second-level buffers 110. In at least one embodiment, the first data processing level 104 and the second data processing level 108 are installed on a common server or cloud computing environment. The first-level buffer 106 includes an input in signal communication with the vehicles 101a-101d and an output in signal communication with the second-level buffers 110a-110d. In at least one embodiment, the first-level buffer 106 is configured as a serial buffer that concurrently buffers data value provided by the data streams 102a-102d. Accordingly, the first-level buffer 106 may process data according to a first-in-first-out scheme.

The second data processing level 108 includes an electronic task, queue and dictionary (TQD) module (not shown in FIG. 4) configured to control operation of the second-level buffers 110a-110d. Accordingly, the second data processing level 108 determines whether a vehicle 101a-101d has requested a new task or updated task based on the task head ID of a tuple 103a-103d. When a new task is requested, the new task is assigned an individual second-level buffer 108. For example, a second-level buffer 108a can be assigned a buffer ID corresponding to the vehicle ID extracted from a tuple 103a-103d. The queue-length of the second-level buffers 110a-110d may be dynamically adjusted based on the throughput of the server or network. When an updated task is requested, the previously assigned second-level buffer is updated. In at least one embodiment, the second data processing level 108 allows buffering of only a single task for a respective vehicle 101a-101d. Accordingly, only a single second-level buffer 110a-110d is assigned to each vehicle 101a-101d until the current working task is completed.

After assigning a task to a respective second-level buffer 110a-110d, each tuple 103a-103d received at the second data processing level 108 is delivered to the correct second-level buffer 110a-110d. For example, tuple 103a containing a vehicle ID for a first vehicle 101a is queued into a first buffer 110a having a buffer ID that matches the vehicle ID of the first vehicle 101a. In this manner, each second-level buffer 110a-110d queues tuples 103a-103d streamed in real-time by a respective vehicle 101a-101d. In other words, the data streams 102a-102d are separated according to the context of each tuple 103a-103d (e.g., vehicle ID), and are queued in respective second-level buffers 110a-110d to establish a second-level parallel and context-based buffering process. Therefore, the non-limiting embodiment illustrated in FIG. 4 provides a first second-level buffer 110a queues tuples 103a streamed by a first vehicle 101a, another second-level buffer 110b queues tuples 103b streamed by a second vehicle 101b, a third second-level buffer 110c queues tuples 103c streamed by a third vehicle 101c, and a fourth second-level buffer 110d queues tuples 103d streamed by a fourth vehicle 101d. Although four second-level buffers 110a-110d are illustrated, the invention is not limited thereto. The second data processing level 108 may also load the tuples 103a-103d according to various priority policies such as, for example, a first-in-first-out scheme, or based on the timestamp IDs contained in the tuples 103a-103d.

The output of each second-level buffer 110a-110d is in signal communication with a respective electronic message handler module 112a-112d. The message handler modules 112a-112d receive the queued tuples 103a-103d and process the task of a particular vehicle 101a-101d based on the embedded task ID and embedded vehicle ID. In at least one embodiment, the message handler modules 112a-112d perform various processes including, but not limiting to, changing the priority at which the task is processed. For example, the processing priority of a task may be changed when the data of a respective vehicle 101a-101d has started processing. Once a message handler module 112a-112d completes a task corresponding to a respective, the message handler module 112a-112d outputs a task completion signal to the second-level buffer 110a-110d and a new task corresponding to the respective vehicle is loaded in the corresponding second-level buffer 110a-110d. In this manner, the second data processing level 108 may contain only one waiting task for each vehicle 101a-101d. Accordingly, real-time data streams output serially from one or more vehicles 101a-101d may be pre-processed in a parallel using second-level buffers 110a-110d. In addition, the parallel buffering of the data stream is performed according to the vehicle-domain specific context of the data stream.

Figure 5:
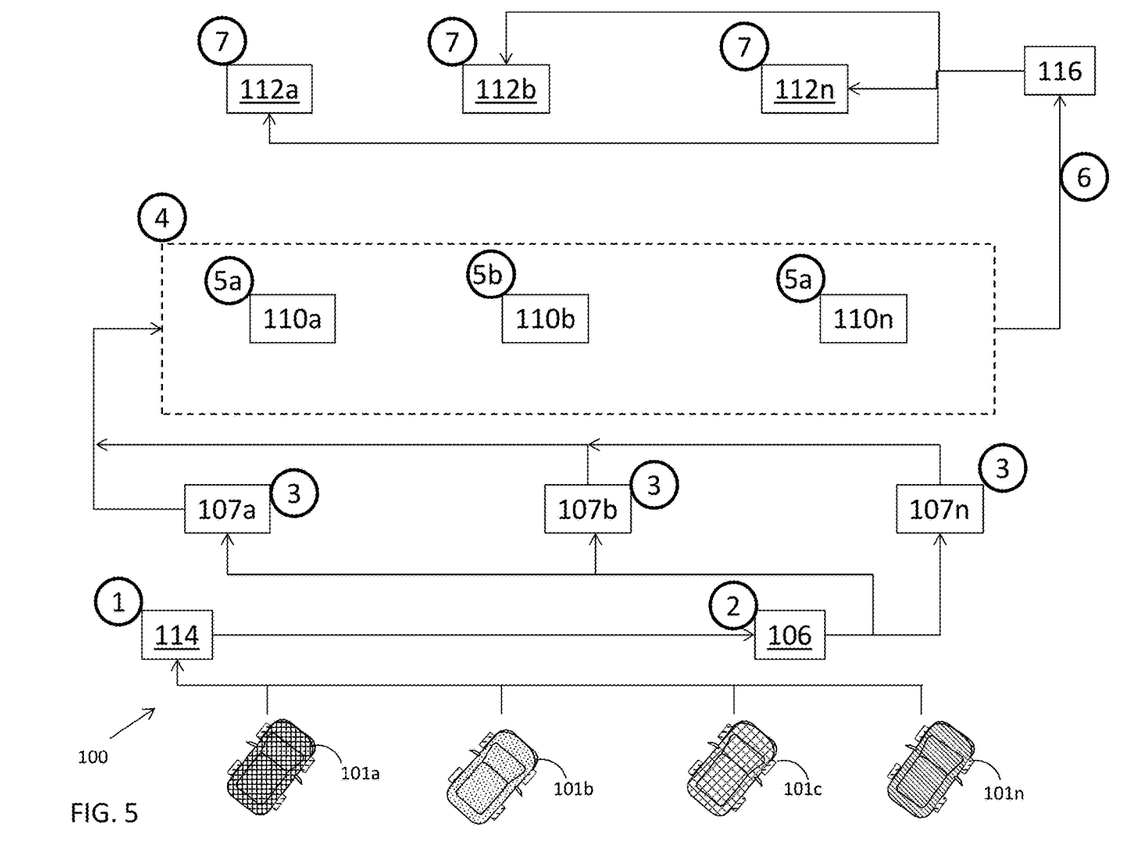
FIG. 5 is a diagram illustrating a vehicle domain multi-level parallel buffering and context-based streaming data pre-processing system according to a non-limiting embodiment.

Turning now to FIG. 5, a vehicle domain multi-level parallel buffering and context-based streaming data pre-processing system 100 is illustrated according to a non-limiting embodiment. The system 100 includes a level-one buffer 106, one or more electronic data porter modules 107a-107n, one or more second-level buffers 110a-110n, an electronic TQD module 111 and one or more electronic message handler modules 112a-112n. The system 100 is in signal communication with one or more vehicles 101a-101n via a receiver 114. The receiver 114 and the level-one buffer 106 are installed at a first data processing level, while the TQD module 111 and the second-level buffers 110a-110n are installed at a second data processing level different from the first data processing level. In at least one embodiment, the level-one buffer 106 ques data (e.g., tuples) from all vehicles 101a-101d exchanging data with the network, while the second-level buffers 110a-110n queue data (e.g., tuples) output a specific vehicle 110a-110n.

The system 100 begins operation (i.e., operation 1) by receiving real-time data streams from the vehicles 101a-101n. Any means for exchanging data between the vehicles 101a-101n and the receiver 114 may be used including, but not limited to, satellite communication. The receiver 114 delivers data to the level-one buffer in a serial manner where it is concurrently or sequentially queued (i.e., operation 2). As previously described, the data-streams generated by each vehicle include a sequence of individual data values such as tuples, for example, indicating a content of a respective data stream. The context indicated by tuples may include, for example, ID of a vehicle 101a-101n, a task header ID, trip ID of a vehicle 101a-101n, timestamp of a vehicle 101a-101n, location of a vehicle 101a-101n, speed of a vehicle 101a-101n, and heading of a vehicle 101a-101n. In at least one embodiment, the first-level buffer is configured as a serial buffer so as to queue raw data delivered by the receiver 114 according to a first in-first-out scheme.

Next, the buffered raw data is output from first-level buffer 106 to the data porter modules 107a-107n (i.e., operation 3). In at least one embodiment, the data porter modules 107 are installed on a multi-core processing unit (CPU), and operate in parallel with one another. Each data porter module 107a-107n is configured to obtain header messages (e.g., a task header ID) embedded in the raw data output from the first-level buffer 106. Based on the header message, the data porter modules 107a-107n determines whether a new task should be created in the second data processing level, or whether an existing task in the second data processing level should be updated. In at least one embodiment, the data porter modules 107a-107n may determine that the second data processing level currently contains a task associated with a particular vehicle, and decide not to create another new task requested by the vehicle until the existing task is processed. In this manner, the second data processing level avoids creating multiple new tasks for each vehicle 101a-101n until the existing task is completed.

The TQD module 111 receives command signals from the data porter modules 107a-107n instructing whether to create a new task in the second data processing level or whether to update an existing task currently processed in the second data processing level (i.e., operation 4). For example, when a new task is requested, the new task is assigned an individual second-level buffer 110a/110n (i.e., operation 5a). Each second-level buffer 110a-110n may be assigned a buffer ID corresponding to the vehicle ID extracted from a tuple of the data stream.

The TQD module 111 may also execute various management operations that control operation of the second-level buffers 110a-110n. For instance, the TQD module 111 may load the tuples into their respective second-level buffers 110a-110n according to various priority policies such as, for example, a first-in-first-out scheme, or based on the timestamp IDs. The TQD module 111 may also dynamically adjust the queue-length of the second-level buffers 110a-110n based on the throughput of the server or network.

When an updated task is requested, the previously assigned second-level buffer 110b is updated (i.e., operation 5b). In at least one embodiment, the TQD module 111 allows buffering of only a single task for a respective vehicle 101a-101d as mentioned above. Accordingly, only a single second-level buffer 110a-110n is assigned to each vehicle 101a-101n until the previously created task that is currently processed in the second-level buffer 110a-110n is completed.

The second-level buffers 110a-110n output the queued tuples to define a separated data steam indicating a task requested from a respective vehicle 101a-101d. Each separated data stream is delivered to an electronic working task dictionary (WTD) module 116 (i.e., operation 6). The WTD module 116 contains information or definitions about the structure of each separated data stream which enables unpacking of fields from the message content for inspection. In at least one embodiment, the WTD module 116 queries the message header or a field within the separated data stream to retrieve a subject classification or keyword. The subject classification or keyword may then be used to route the separated data stream to a corresponding message handler modules 112a-112n (i.e., operation 7).

The message handler modules 112a-112n are operable in response to the decisions of the WTD module 116. For example, the WTD module 116 analyzes the separate data streams and determines a specific message handler module 112a-112n configured to perform processing operations capable of performing a task requested by a respective vehicle 101a-101n.

For example, all tasks which include image content or for which require some image processing of that content are delivered to a message handler module 112a-112n configured to process images. Similarly, all tasks including audio data which require audio processing are passed to a message handler module 112a-112n configured to process audio data. Tasks including other identifiable data types are passed to a respective message handler module 112a-112n capable of processing the task. This operation may entail delivering a separate data stream through a sequence of processing steps each performed by a different message handler module 112a-112n if the message includes a number of content types. Tasks containing executable code may be passed to a message handler module 112a-112n that performs authentication (for example, digital signature verification or virus checking) prior to permitting publication, to protect subscribers from undesirable program code.

In at least one embodiment, the processing which is performed by a selected message handler module 112a-112n is determined by the specified requirements of individual subscriber applications, the particular characteristics of the requested task and content of a separated data stream, and the capabilities of the subscriber system. For instance, a task ID embedded in a tuple of the separate data stream may indicate the existence of specific multimedia content and reveal the characteristics of the content that would be relevant to a determination of how separated data stream should be processed. In some circumstances, the task ID could also indicate one or more code modules that would be required for appropriately processing the identified content. The selected message handler module 112a-112n then performs operations on the separated data stream in accordance with the associated task definition. According to at least one embodiment, the result, i.e., the completed task may then be returned to the corresponding vehicle 101a-101n that submitted the requested task.

Figure 6:
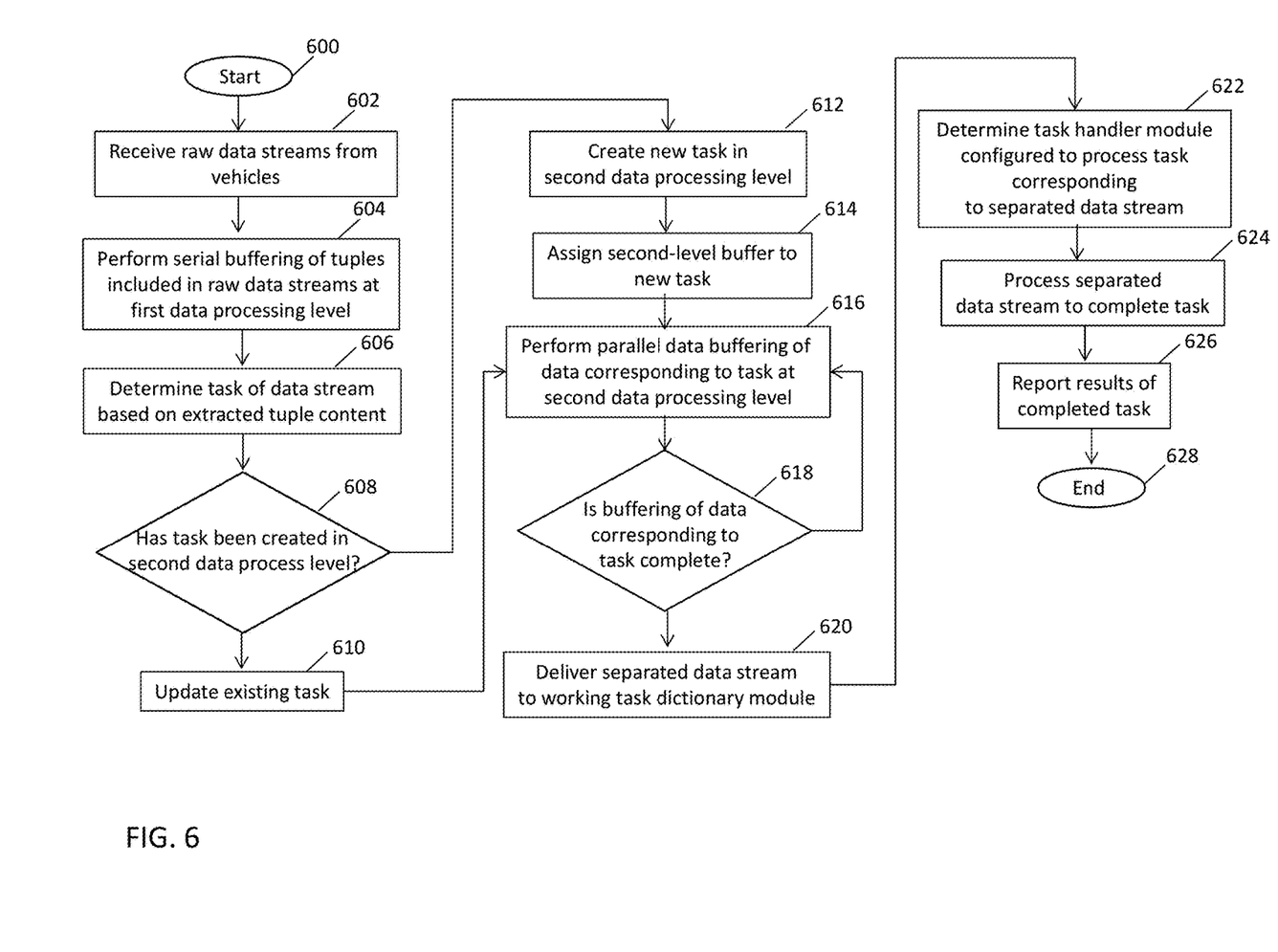
FIG. 6 is a flow diagram illustrating a method of controlling a vehicle domain multi-level parallel buffering and context-based streaming data pre-processing system 100 is illustrated according to a non-limiting embodiment.

With reference now to FIG. 6, a method of controlling a vehicle domain multi-level parallel buffering and context-based streaming data pre-processing system 100 is illustrated according to a non-limiting embodiment. The method begins at operation 600, and at operation 602, raw data streams output from one or more vehicles are received. In at least one embodiment, the vehicles output the data streams serially. At operation 604, the raw data streams are buffered at a first data processing level. According to at least one embodiment, raw data streams include tuples and the tuples are buffered serially in a first-level buffer according to a first-in-first-out scheme. At operation 606, a task is determined based on the data context derived from tuples output from the first-level buffer. In at least one embodiment, each tuple includes a topic ID that indicates the task. At operation 608, an analysis is performed to determine whether the determined task currently exists in a second data processing level of the system. When the task exists, the existing task is updated in the second data processing level at operation 610. When, however, the determined task does not exist in the second data processing level, a new task is created at operation 612. In at least one embodiment, the second data processing level processes only a single existing task for each vehicle communicating with the system until the existing task undergoing work is completed.

At operation 614, a second-level buffer is assigned to the newly created task. In at least one embodiment, the second-level buffer is assigned a buffer ID which matches a vehicle ID corresponding to the vehicle requesting the task. At operation 616, a TQD module installed at the second data processing level performs parallel data buffering of tasks corresponding to the raw data streams delivered from the first data processing level. In this manner, data streams may be output by the vehicles in a serial manner, while pre-processing data buffering is performed in parallel according to a context-based analysis.

Turning to operation 618, an analysis is performed to determine whether the buffering process of one or more second-level buffers is complete. If the buffering of a task is still on going, the method returns to operation 616 so as to continue buffering the data (e.g., tuples) of the corresponding task. When, however, the buffering is complete, a separate data stream is generated, and is delivered to a WTD module at operation 620. At operation 622, the WTD module determines one or more task handler modules configured to process the separated data stream. The separated data stream is then delivered to the appropriate task handler modules for processing at operation 624. At operation 626, the results of the completed task are reported, and the method ends at operation 628.

According to various non-limiting embodiments described above, a multi-level parallel buffering and context-based streaming data pre-processing system is configured to initially organize high volume data in a first-level buffering queue, and then quickly dispatch first-level buffered data into a second-level buffering queue to perform context based data pre-processing. In this manner, the latency in real-time location-based services during peak data rate periods may be reduced by approximately 20% to approximately 30%. Accordingly, the performance and output of the computer system, server and/or cloud network is greatly improved compared to conventional data stream processing systems and/or existing internet-based frameworks.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

As used herein, the term "module" refers to an application specific integrated circuit (ASIC), an electronic circuit, an electronic hardware computer processor (shared, dedicated, or group) and memory that executes one or more software or firmware programs, a combinational logic circuit, a microprocessor, and/or other suitable components that provide the described functionality. When implemented in software, a module can be embodied in memory as a non-transitory machine-readable storage medium readable by a processing circuit and storing instructions for execution by the processing circuit for performing a method.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A vehicle domain multi-level parallel buffering and context-based streaming data pre-processing system comprising:
    a first data processing level including a first-level buffer configured to store high volume data received from a plurality of different vehicles; and
    a second data processing level in signal communication with the first data processing level, the second data processing level including an electronic task-queue-dictionary (TQD) module and a plurality of second-level data processing buffers, the TQD module configured to create a plurality of process operating tasks based on the high volume data output from the first-level buffer, the process operating tasks corresponding to available processing operations performed by a local vehicle operating in the vehicle domain multi-level parallel buffering and context-based streaming and data pre-processing system, each process operating task corresponding to a request from a respective vehicle among the plurality of vehicles,
    wherein the TQD module separates the high volume data into individual data values having a data volume less than the high-volume data, the individual data values indicative of a given processing task among the created processing tasks based on a comparison between the requested tasks and the available processing operations, and wherein the TQD module stores each individual data value in a respective second-level buffer assigned to store given individual data values corresponding to the processing operation task of the individual data value.

2. The system of claim 1, wherein the TQD module delivers the individual data values in parallel to the corresponding second-level buffers.

3. The system of claim 2, wherein the individual data values include vehicle identification information, and the TQD module assigns a buffer identification value to each second-level buffer such that the individual data values are loaded into a corresponding second-level buffer having a buffer identification value that matches the vehicle identification information.

4. The system of claim 2, wherein the TQD module limits each vehicle to a single working task created in the second data processing level.

5. The system of claim 2, wherein the TQD module loads each second-level buffer based on a timestamp indicated by a respective individual data value.

6. A method of processing data streams in a vehicle domain, the method comprising:

storing, in a first data processing level including a first-level buffer, high volume data received from a plurality of different vehicles;

creating, via an electronic task-queue-dictionary (TQD) module installed in a second data processing level in signal communication with the first data processing level, a plurality of process operating tasks based on the high volume data output from the first-level buffer, the process operating tasks corresponding to available processing operations performed by a local vehicle operating in the vehicle domain multi-level parallel buffering and context-based streaming and data pre-processing system, each process operating task corresponding to a request from a respective vehicle among the plurality of vehicles;

separating, via the TQD module, the high volume data into individual data values having a data volume less than the high-volume data, the individual data values indicative of a given processing task among the created processing tasks based on a comparison between the requested tasks and the available processing operations; and storing each individual data value in a respective second-level buffer installed in the second data processing level, the second-level buffer assigned to store data values corresponding to the processing operation task of the individual data value.

7. The method of claim 6, wherein the TQD module delivers the individual data values in parallel to the corresponding second-level buffers.

8. The method of claim 7, further comprising embedding vehicle identification information in the individual data values, wherein the TQD module assigns a buffer identification value to each second-level buffer such that the individual data values are loaded into a corresponding second-level buffer having a buffer identification value that matches the vehicle identification information.

9. The method of claim 7, wherein the TQD module limits each vehicle to a single working task created in the second data processing level.

10. The method of claim 7, wherein the TQD module loads each second-level buffer based on a timestamp indicated by a respective individual data value.

11. A computer program product to control a vehicle domain multi-level parallel buffering and context-based streaming data pre-processing system, the computer program product comprising a computer readable storage medium having program instructions embodied therewith, the program instructions executable by an electronic computer processor such that the system performs operations comprising:

storing, in a first data processing level including a first-level buffer, high volume data received from a plurality of different vehicles;

creating, via an electronic task-queue-dictionary (TQD) module installed in a second data processing level in signal communication with the first data processing level, a plurality of process operating tasks based on the high volume data output from the first-level buffer, the process operating tasks corresponding to available processing operations performed by a local vehicle operating in the vehicle domain multi-level parallel buffering and context-based streaming and data pre-processing system, each process operating task corresponding to a request from a respective vehicle among the plurality of vehicles;

separating, via the TQD module, the high volume data into individual data values having a data volume less than the high-volume data, the individual data values indicative of a given processing task among the created processing tasks based on a comparison between the requested tasks and the available processing operations; and storing each individual data value in a respective second-level buffer installed in the second data processing level, the second-level buffer assigned to store given individual data values corresponding to the processing operation task of the individual data value.

12. The computer program product of claim 11, wherein the operations further comprise delivering the individual data values in parallel to the corresponding second-level buffers.

13. The computer program product of claim 12, wherein the operations further comprise embedding vehicle identification information in the individual data values, and assigning a buffer identification value to each second-level buffer such that the individual data values are loaded into a corresponding second-level buffer having a buffer identification value that matches the vehicle identification information.

14. The computer program product of claim 12, wherein the operations further comprise limiting each vehicle to a single working task created in the second data processing level.

15. The computer program product of claim 12, wherein the operations further comprise loading each second-level buffer based on a timestamp indicated by a respective individual data value.

* * * * *